US012681718B2

(12) United States Patent (10) Patent No.: US 12,681,718 B2
Kapoor et al. (45) Date of Patent: Jul. 14, 2026

(54) CLOUD-INDEPENDENT NODE UPGRADE

(71) Applicant: Pegasystems Inc., Cambridge, MA (US)

(72) Inventors: Karan Kapoor, Boston, MA (US); Abirami Natarajan, Plainville, MA (US); Kevin Lee Walsh, Abington, MA (US)

(73) Assignee: Pegasystems Inc., Cambridge, MA (US)

( * ) Notice: Subject to any disclaimer, the term of this patent is extended or adjusted under 35 U.S.C. 154(b) by 391 days.

(21) Appl. No.: 17/139,267

(22) Filed: Dec. 31, 2020

(65) Prior Publication Data

US 2022/0035626 A1     Feb. 3, 2022

Related U.S. Application Data

(60) Provisional application No. 63/059,294, filed on Jul. 31, 2020.

(51) Int. Cl.
G06F 8/656 (2018.01)
H04L 67/10 (2022.01)

(52) U.S. Cl.
CPC .............. G06F 8/656 (2018.02); H04L 67/10 (2013.01)

(58) Field of Classification Search
CPC ................................. G06F 8/656; H04L 67/10
See application file for complete search history.

(56) References Cited

U.S. PATENT DOCUMENTS 9,557,879 B1 * 1/2017 Wang .................... H04L 41/145
11,029,943 B1 * 6/2021 Delchev .................. H04L 67/34

| | | | | |
|---|---|---|---|---|
| 11,163,669 B1 * | 11/2021 | Torun | ........................ | G06F 8/65 |
| 11,194,566 B1 * | 12/2021 | Gabrielson | ............... | G06F 8/65 |
| 2019/0266502 A1 * | 8/2019 | Moser | ................. | G06F 11/3409 |
| 2020/0153898 A1 * | 5/2020 | Sabath | ................... | G06F 9/4856 |
| 2020/0379746 A1 * | 12/2020 | Shivashankara | ........ | H04L 63/10 |
| 2021/0109734 A1 * | 4/2021 | Vittal | .................. | G06F 11/1433 |
| 2022/0035626 A1 * | 2/2022 | Kapoor | ................... | G06F 8/656 |

OTHER PUBLICATIONS

Kubernetes, Pod Termination, Internet Archive (Published Aug. 6, 2018) retrieved from https://web.archive.org/web/20180806205742/ https://unofficial-kubernetes.readthedocs.io/en/latest/concepts/ abstractions/pod-termination/ on Sep. 26, 2023 (Year: 2018).*

* cited by examiner

*Primary Examiner* — Lewis A Bullock, Jr.
*Assistant Examiner* — Theodore E Hebert
(74) *Attorney, Agent, or Firm* — Kim IP Law Group LLC

(57) ABSTRACT

Systems, methods, and computer program products are disclosed for upgrading a container node in a cloud environment. The system includes a processor coupled to a memory and a network interface. The processor is configured to obtain a version identifier associated with a cloud-based server instance and one or more container nodes operable in a cloud environment. The processor is further configured to identify the one or more container nodes associated with the cloud-based server instance. The processor is further configured to upgrade the one or more container nodes by instantiating one or more replacement container nodes having a pre-determined upgrade configuration associated with a new version identifier. The processor is further configured to associate the new version identifier with the cloud-based server instance and the one or more replacement container nodes.

19 Claims, 7 Drawing Sheets

Map 330b

| Server | Version | Node |
|--------|---------|------|
| 240f | v1 | N6 |
| 310a | v2 | N9 |
| 310b | v2 | N10 |

410   Obtain Version Identifier Associated with Server Instance

420   Identify Container Nodes Associated with Server Instance

430   Upgrade Container Nodes By Instantiating Replacement Container Nodes

440   Associate New Version Identifier with Server Instance and Replacement Container Nodes Computer System Server 600

Memory 604

Storage 610

Network 606

Processor 602

Bus 616

I/O 608

External Devices 612

Display 614

CLOUD-INDEPENDENT NODE UPGRADE

CROSS REFERENCE TO RELATED APPLICATIONS

The present application claims the benefit of U.S. Provisional Patent Application No. 63/059,294 filed Jul. 31, 2020 entitled "CLOUD-AGNOSTIC INSTANCE UPGRADE SYSTEMS AND METHODS," the entire disclosure of which is incorporated by reference herein for all purposes.

FIELD OF THE INVENTION

The present invention relates generally to an upgrade system for a cloud environment. In particular, the present invention relates to a system for upgrading container nodes in a container cluster of a cloud environment.

BACKGROUND OF THE INVENTION

Conventionally, server administrators deployed applications on individual physical servers. This type of deployment poses several challenges. The sharing of physical hardware and software resources means that one application can take up most of the processing power, limiting performance of other applications on the same physical server. Upgrading hardware or software running on the physical server to improve performance requires undesired downtime. Thus, it may take a long time to expand hardware capacity, in turn increasing operational, maintenance, and administration costs.

To resolve such hardware and software limitations, organizations began deploying cloud environments in which physical server machines were virtualized. Virtualized deployment allows an administrator to create and manage isolated virtual environments, sometimes referred to as Virtual Machines (VM), on a single physical server. This solution isolates applications within a VM, limits use of hardware and software resources, and increases security. For example, a software application executing on a VM in a cloud environment is no longer allowed unfettered access to information and data processed by another application. Virtualized deployments allow administrators to scale quickly and spread hardware and software resources of a single physical server, update on demand, and keep hardware costs in check. Each VM has its own operating system and may run all necessary systems atop virtualized hardware. However, upgrading a VM in a cloud environment still requires undesired downtime.

Container deployment provides a more flexible and efficient model compared to standalone virtual machines in a cloud environment. Similar to VMs, containers have individual memory, system files, and processing space. However, strict isolation is no longer a limiting factor. For example, containers allow multiple applications to now share the same underlying operating system. Accordingly, containers may be considered more efficient than full VMs. The container structure also allows for applications to run as smaller, independent parts. These parts may then be deployed and managed dynamically on multiple machines. With such efficiency, however, may come complexity whereby the elaborate structure and segmentation of containerized tasks become too complex for manual administration and management. Upgrading container nodes, for example, can still require a manual upgrade process resulting in undesired downtime.

SUMMARY OF THE INVENTION

In a first aspect, a system is provided for upgrading a container node in a cloud environment. The system includes a processor coupled to a memory and a network interface. The processor is configured to obtain a version identifier associated with a cloud-based server instance and one or more container nodes operable in a cloud environment. The processor is further configured to identify the one or more container nodes associated with the cloud-based server instance. The processor is further configured to upgrade the one or more container nodes by instantiating one or more replacement container nodes having a pre-determined upgrade configuration associated with a new version identifier. The processor is further configured to associate the new version identifier with the cloud-based server instance and the one or more replacement container nodes.

In some embodiments, the processor is configured to obtain the version identifier from a map tracking a plurality of version identifiers, a plurality of cloud-based server instances, and a plurality of container nodes. The processor is configured to associate the new version identifier into the map tracking the plurality of version identifiers, the plurality of cloud-based server instances, and the plurality of container nodes. The processor configured to upgrade the one or more container nodes includes the processor being further configured to upgrade a configuration for the cloud-based server instance, select a subset of cloud-based server instances for upgrading, identify one or more container nodes configured on each cloud-based server instance of the subset and one or more container deployment units associated with each identified container node, prepare the identified container nodes for upgrade, and migrate the one or more container deployment units to one of the replacement container nodes. The processor configured to upgrade the configuration for the cloud-based server instance includes the processor being further configured to provision an updated configuration for the cloud-based server instance. The processor is configured to select the subset of cloud-based server instances based on a visibility of the one or more container nodes configured on each cloud-based server instance. The system is operable outside a container cluster of the one or more container nodes. The system is operable in a control plane of a container cluster of the one or more container nodes.

In a second aspect, a method is provided for upgrading a container node in a cloud environment. The method includes obtaining a version identifier associated with a cloud-based server instance and one or more container nodes operable in a cloud environment. The method further includes identifying the one or more container nodes associated with the cloud-based server instance. The method further includes upgrading the one or more container nodes by instantiating one or more replacement container nodes having a pre-determined upgrade configuration associated with a new version identifier. The method further includes associating the new version identifier with the cloud-based server instance and the one or more replacement container nodes.

In some embodiments, the upgrading the one or more container nodes further includes identifying one or more child objects associated with the one or more container nodes. The upgrading the one or more container nodes further includes migrating the one or more child objects to the one or more replacement container nodes. The one or more child objects include one or more container deployment units. The one or more child objects comprise one or more Kubernetes pods. The one or more container nodes are operable on a plurality of cloud environments. The one or more replacement container nodes are operable on a plurality of cloud environments. The one or more replacement container nodes are operable on a cloud environment that is different from the cloud environment on which the one or more container nodes are operable. The upgrading the one or more container nodes further comprises instantiating the one or more replacement container nodes on a new cloud-based server instance that is operable on a different cloud infrastructure from the initial cloud-based server instance. The cloud-based server instance includes an Elastic Cloud Computing instance. The cloud-based server instance belongs to an Auto Scaling Group. The one or more container nodes comprise one or more Kubernetes worker nodes.

BRIEF DESCRIPTION OF THE DRAWINGS

The foregoing summary, as well as the following detailed description of the exemplary embodiments of the invention, will be better understood when read in conjunction with the appended drawings. For the purpose of illustrating the invention, there are shown in the drawings embodiments, which are presently preferred. It should be understood, however, that the invention is not limited to the precise arrangements and instrumentalities shown.

In the drawings.

DETAILED DESCRIPTION OF THE DRAWINGS

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. For example, the term "a," as used in the specification, means "at least one." The terminology includes the words above specifically mentioned, derivatives thereof, and words of similar import.

Figure 1:
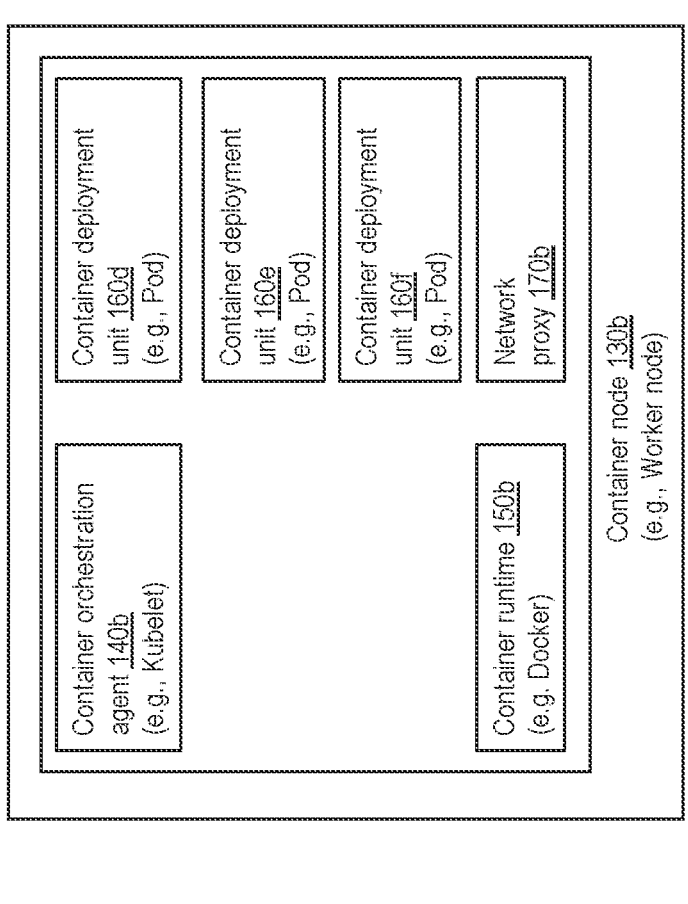
FIG. 1 illustrates a portion of an exemplary system in which techniques for upgrading a container node in a cloud environment can be practiced, in accordance with exemplary embodiments of the present invention.
Figure 1:
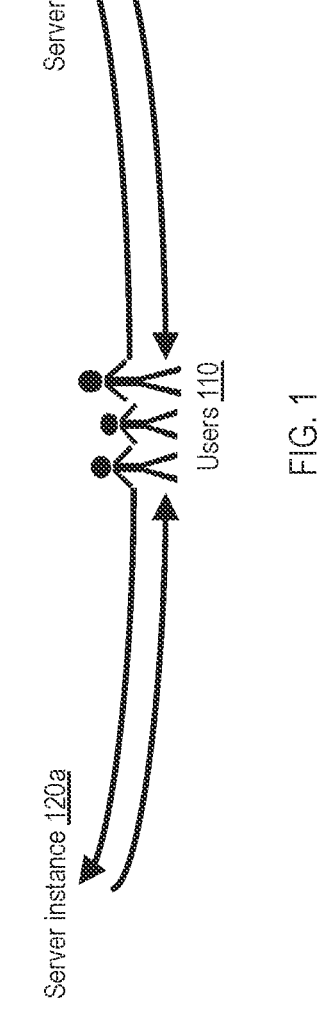

Referring now to FIG. 1, an exemplary system 100 is shown for upgrading a container node in a cloud environment, in accordance with exemplary embodiments. The system includes a container deployment in a cloud environment. The cloud environment includes server instances 120a, 120b. The server instances include container nodes 130a, 130b. The container nodes include container orchestration agents 140a, 140b, container runtimes 150a, 150b, container deployment units 160a, 160b, 160c, 160d, 160e, 160f, and network proxies 170a, 170b.

The server instances 120a, 120b are configured to receive requests from and send data to the users 110. The server instances are configured to provide virtual servers for hosting the container nodes 130a, 130b. The server instances are sometimes referred to herein as cloud-based server instances. The server instances are configured in a cloud environment that is provided from a cloud provider. The cloud environment is sometimes referred to herein as a cloud infrastructure. Non-limiting example cloud providers include Amazon Web Services (AWS), Google Cloud, Microsoft Azure, or other suitable cloud providers as known to one having ordinary skill in the art. In some aspects, the server instances may be AWS Elastic Cloud Computing (EC2) instances. In further aspects, the server instances may belong to an Automatic Scaling Group (ASG). An Auto Scaling Group refers to a collection of EC2 instances configured for improved performance and load balancing of a cloud application.

The container nodes 130a, 130b are configured to execute on the server instances 120a, 120b. The container nodes listen to the container API server (not shown) for new work assignments. Upon receipt, the container nodes execute the received work assignments and then report the results to a container master node (not shown). In some aspects, the container nodes may be Kubernetes worker nodes. Kubernetes is a container orchestration system provided by the Linux Foundation in San Francisco, California, United States.

The container orchestration agents 140a, 140b are configured to execute on the container nodes 130a, 130b. The container orchestration agent is configured to coordinate and schedule the container node's hardware and software resources among the broader container cluster of container nodes. For example, the container orchestration agent may be configured to coordinate the container node's virtual or physical processor, memory, storage, operating system, or other suitable resources, as described in further detail below in connection with FIG. 6. The container orchestration agent is also configured to monitor the container deployment units and report if a container deployment unit is not fully functional. In some aspects, the container orchestration agents may be Kubernetes kubelets. In other aspects, the container orchestration agents may be provided by Apache Mesos (provided by the Apache Software Foundation in Wilmington, Delaware, United States) or Docker Swarm (provided by Docker, Inc. in Palo Alto, California, United States).

The container runtimes 150a, 150b are configured to start and stop containers. For example, the container runtime may retrieve container images from a container image registry (not shown). As used herein, a container refers to a stand-alone, executable unit of software that packages up software code and associated dependencies so that a containerized application runs quickly and reliably from one computing or cloud environment to another. Advantageously, containers allow administrators to execute software applications without requiring complex or time-consuming installation. A non-limiting example of a containerized application is Pega Platform from Pegasystems Inc. in Cambridge, Massachusetts, United States. In some aspects, the container runtime may be a Docker container engine provided by Docker, Inc.

in Palo Alto, California, United States. In other aspects, the container runtime may be containerd, rkt, CRI-O, or any other container runtime compliant with the Open Container Initiative promulgated by the Linux Foundation in San Francisco, California, United States.

The container deployment units 160*a*, 160*b*, 160*c*, 160*d*, 160*e*, 160*f* are configured to schedule execution of containers and containerized applications therein. The container deployment units allow a container node to be part of a container cluster. The container deployment unit is configured to act as a wrapper for launching and executing an individual container with a containerized application. Advantageously, the container deployment units allow for decoupling of a containerized application from a specific instance of a container deployment unit. Instead, a containerized application may be designed so that a replacement container deployment unit running on any container node in a container cluster may seamlessly replace an initial container deployment unit. In some aspects, the container deployment units may be Kubernetes pods.

The network proxies 170*a*, 170*b* are configured to allow the container nodes 130*a*, 130*b* to communicate with other networked container nodes or with other servers on a local network or on the Internet. In some aspects, the network proxies are configured to ensure that a container node receives an Internet Protocol (IP) address and implements local iptables and rules to handle routing and traffic load-balancing. In some aspects, the network proxies may be Kubernetes kube-proxies.

Figure 2:
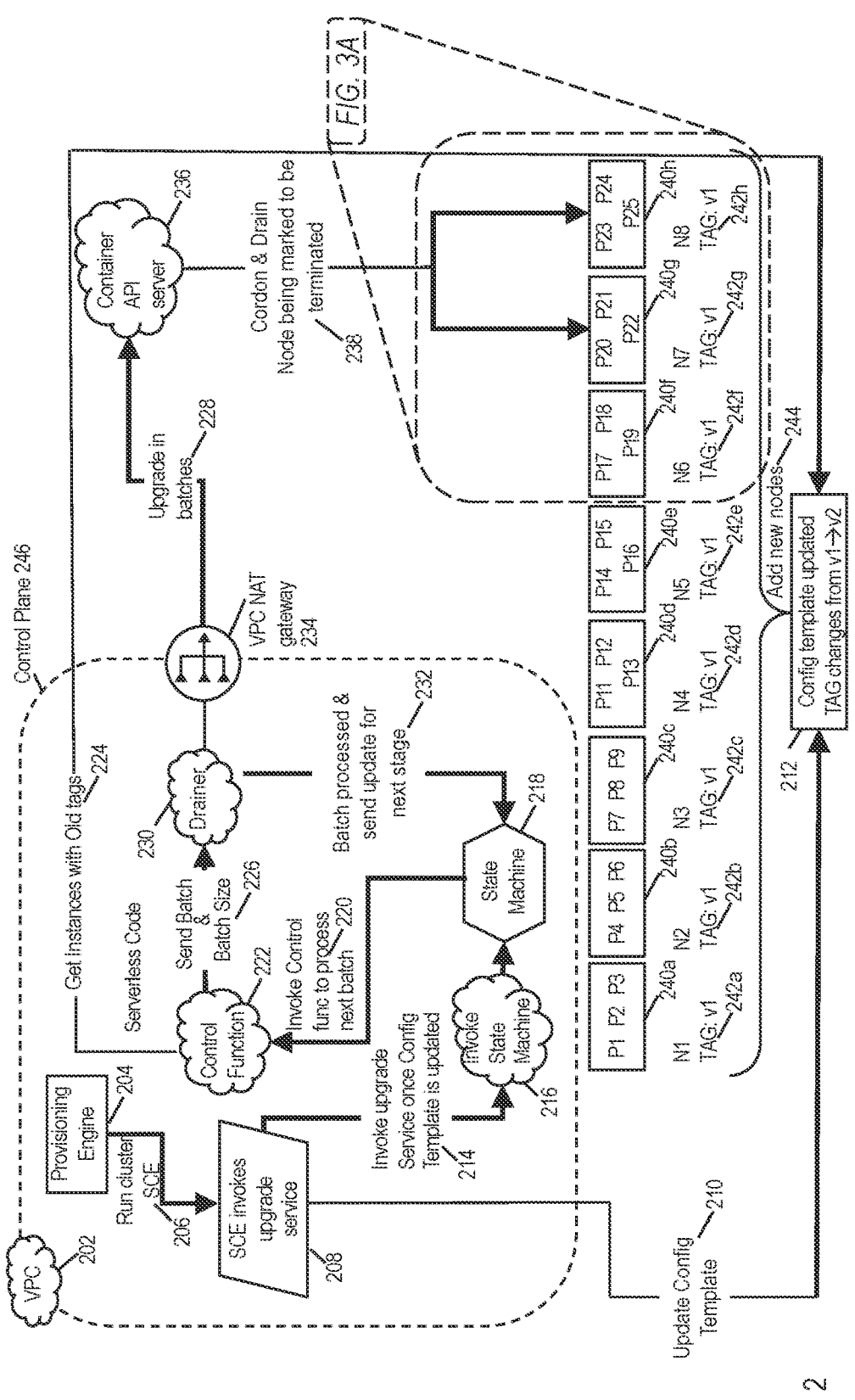
FIG. 2 is a block diagram including an exemplary method for upgrading a container node in a cloud environment, in accordance with exemplary embodiments of the present invention.

Referring now to FIG. 2, an exemplary method 200 is shown for upgrading a container node in a cloud environment, in accordance with exemplary embodiments. The method begins in a virtual private cloud (VPC) 202 that forms part of a control plane 246 of the container cluster (e.g., a Kubernetes cluster). Advantageously, the VPC functions similar to a fully private cloud that runs on a public cloud infrastructure. Non-limiting examples of a public cloud infrastructure include AWS, Google Cloud, Microsoft Azure, or other suitable public cloud environments known to one having ordinary skill in the art. A provisioning engine 204 executes a cluster service catalog entry (SCE) module (step 206).

An upgrade service is configured for upgrading a container node in a cloud environment (step 208). The upgrade service prepares to upgrade the server instances 240*a*, 204*b*, 240*c*, 240*d*, 240*e*, 240*f*, 240*g*, 240*h*. The SCE module updates a configuration template for use in upgrading the server instances (step 210). Once the cloud instance manager 212 updates the configuration template, the SCE invokes the upgrade service (step 214). The upgrade service is configured to invoke a state machine 218 (step 216).

The state machine 218 is configured to manage a control process and a drain process, as described in further detail herein. In some aspects, the control and drain processes can be stateless. This stateless design simplifies the control and drain processes by allowing the external state machine to manage and coordinate the relevant state and operations. The state machine is configured to operate in the cloud environment (e.g., VPC 202 or generally in the control plane 246 of the container cluster) and configured to coordinate control between the control and drain processes.

The control process 222 is invoked by the state machine 218 to process the container nodes for upgrade (step 220). The control process registers an event subscription with the cloud instance manager 212 to identify outdated server instance configurations, e.g., configurations indicating that the associated server instance is an upgrade candidate. In some aspects, the event subscription is associated with a query constructed to identify an enumeration of server instances with outdated configurations, based on a version identifier associated with the server instance (step 224). For example, the control process may query a map to identify server instances associated with a version identifier indicating version 1 (v1), e.g., the server instance is running an outdated version 1 of the associated configuration when the desired configuration is version 2 (v2). Based on the version identifier, the control process requests from the VPC an enumeration of server instances running an outdated configuration. In some aspects, the control process processes the enumeration into subsets or batches of server instances so that a portion but not all of the outdated server instances can be upgraded during a given session. In further aspects, control process may determine the size of the subsets or batches as a percentage of the total number of server instances identified for upgrade. The control process provides the enumeration to the drain process 230 (step 226).

The drain process 230 is invoked by the state machine 218 to process the enumeration of outdated server instances for upgrade. In some aspects, the drain process processes the enumeration in subsets or batches as identified by the control process 222 (step 228). The drain process communicates with a container application programming interface (API) server 236 (e.g., a Kubernetes API server) to upgrade an identified container node. For example, FIG. 2 illustrates a container environment including server instances 240*a*, 240*b*, 240*c*, 240*d*, 240*e*, 240*f*, 240*g*, 240*h*. Each server instance has a version identifier 242*a*, 242*b*, 242*c*, 242*d*, 242*e*, 242*f*, 242*g*, 242*h* indicating that the server instance is running version 1 (v1) of the corresponding configuration. Accordingly, each server instance is running an outdated configuration and is desired to be upgraded to the most current configuration, e.g., version 2 (v2). The control process 222 and the drain process identify a subset or batch of server instances for upgrade, e.g., server instances 240*g*, 240*h*. The upgrade process for these server instances 240*g*, 240*h* is described in further detail below in connection with FIGS. 3A, 3B, 4, and 5.

Upon completion of processing one subset or batch of outdated server instances from the enumeration, the drain process 230 sends an update for the state machine 218 to trigger the control process 222 to process a subsequent subset or batch of outdated server instances (step 232). In some aspects, the drain process 230 triggers a cordon and drain upgrade process. For example, the cordon and drain upgrade process is configured to mark a given container node unschedulable (so that the container node cannot be scheduled to execute a containerized application via its container deployment unit), drain the container node, and mark the container node for termination (step 238), for example, once the replacement container node is successfully operating in the upgraded server instance. Upon completion, the cloud instance manager 212 marks the version identifiers as successfully changed, for example, from v1 to v2.

Figure 3A:
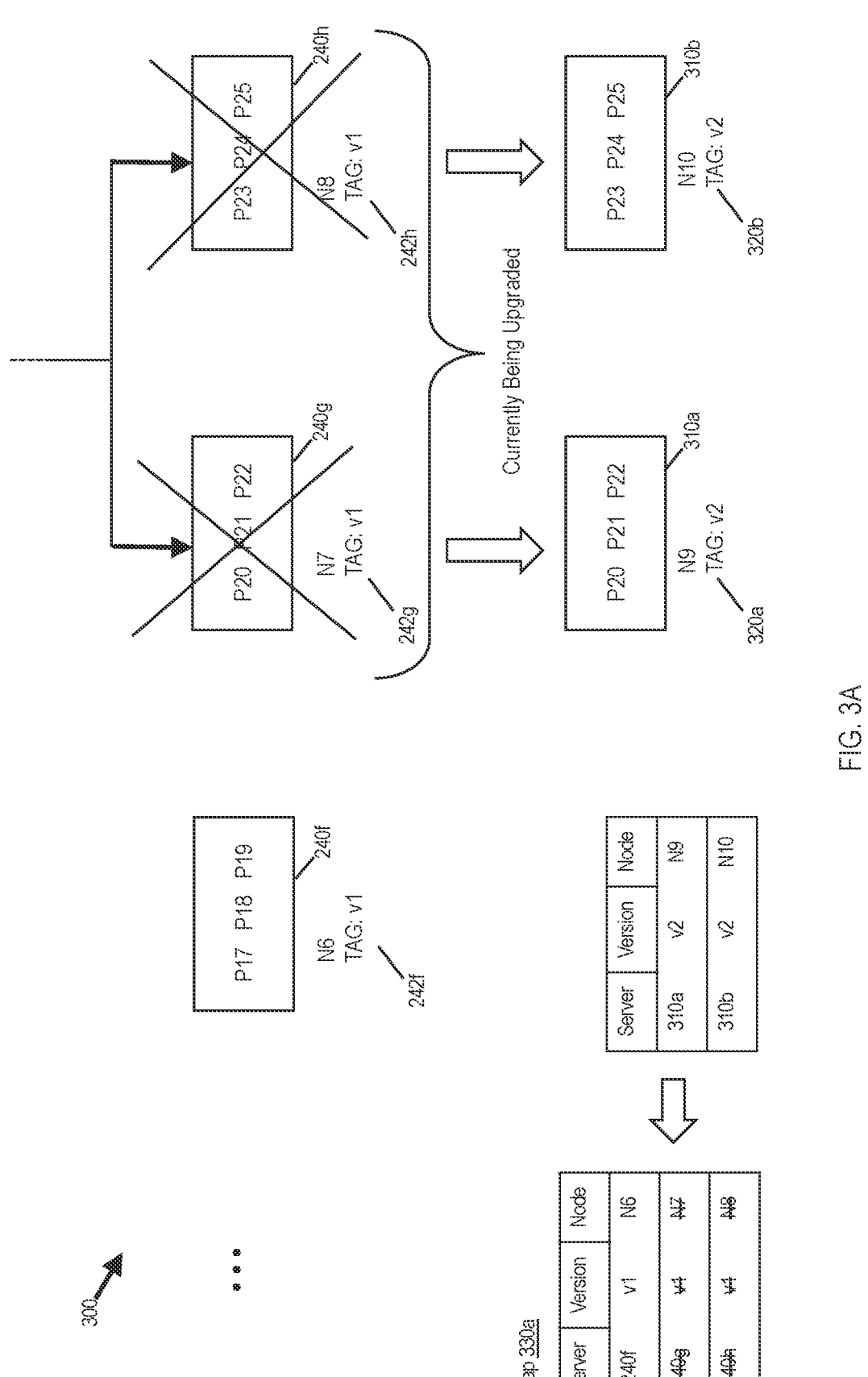
FIGS. 3A-3B are block diagrams of portions of an exemplary cloud environment for upgrading a container node, in accordance with exemplary embodiments of the present invention.

Referring now to FIG. 3A, a block diagram is shown of a portion of an exemplary cloud environment 300 for upgrading a container node, in accordance with exemplary embodiments. The cloud environment includes server instances 240*f*, 240*g*, 240*h*, each server instance having an associated container node N6, N7, N8, and an associated version identifier 242*f*, 242*g*, 242*h*, respectively. The version identifiers all indicate v1 for each server instance configurations, reflecting that the relevant configuration is on version 1. The cloud environment also includes a map 330a that tracks server instances, version identifiers, and container nodes.

FIG. 3A illustrates a portion of an exemplary cloud environment 300 in which the control process 222 (FIG. 2) has identified a subset or batch of server instances, including the server instances 240g, 240h on which to upgrade the container nodes N7 and N8, respectively.

The upgrade service 208 (FIG. 2) triggers a provisioning engine to upgrade the configuration of each server instance 240g, 240h (e.g., each Amazon EC2 instance). However, the upgrade service does not modify the configuration running on the server instances, as discussed in further detail below. For example, the provisioning engine begins with a provisioning subsystem, such as one supplied by Amazon, to update the Amazon ASG configuration for each EC2 instance. By way of non-limiting example, the server instance 240g can have its configuration updated to the desired server instance configuration, e.g., illustrated as a replacement server instance 310a. The server instance 240h can likewise have its configuration updated to the desired server instance configuration, e.g., illustrated as a replacement server instance 310b.

However, although the provisioning subsystem supplied by any public cloud provider (e.g., Amazon) is operable to upgrade the corresponding server instance configuration (e.g., the ASG configuration for each EC2 instance), the present upgrade system avoids executing the Amazon provisioning subsystem to upgrade the configuration running on each EC2 instance itself. This is because the Amazon provisioning subsystem is not designed to support containerized upgrades or allow administrators to specify customized machine images (such as Amazon Machine Images (AMIs)) for upgrade. Accordingly, applying Amazon's provisioning subsystem to upgrade each EC2 instance could result in undesired downtime for the services running on the EC2 instance. Instead, the present upgrade system provides an automated container upgrade by ensuring orderly termination of each container deployment unit, and accounting for upgrading the container deployment units (e.g., Kubernetes pods) including the containerized applications running in each container node (e.g., Kubernetes worker node).

After successfully upgrading the configuration for the desired server instance (e.g., the ASG configuration for the desired EC2 instance), the drain process 230 constructs a query via the container API server 236 (FIG. 2) to identify container nodes for upgrade associated with the server instances that were identified by the control process. For example, the present upgrade system identifies the container nodes N7 and N8 running on the server instances 240g, 240h, respectively. Upon identification of the relevant container nodes, the drain process drains each container node as described above so as to provide an orderly termination that avoids undesired downtime.

In some aspects, the present upgrade system migrates associated child objects from each server instance marked for termination. For example, the present upgrade system migrates the container deployment units P20, P21, P22 from the container node N7 configured on the server instance 240g to the replacement container node N9 configured on the replacement server instance 310a that is running the desired current server instance configuration. Likewise, FIG. 3A illustrates migrating the child objects P23, P24, P25 associated with the container node N8 configured on the server instance 240h to the replacement container node N10 configured on the replacement server instance 310b that is running the desired current server instance configuration.

In some aspects, upon completion, the present upgrade system updates the map 330a accordingly with the updated server instances (e.g., 310a, 310b respectively), version identifiers (e.g., v2), and container nodes (e.g., N9, N10 respectively) to reflect the upgraded configuration.

Figure 3B:
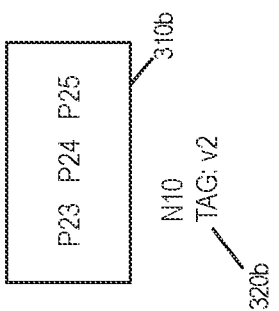
Figure 3B:
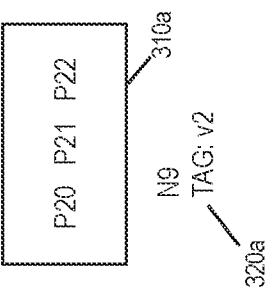
Figure 3B:
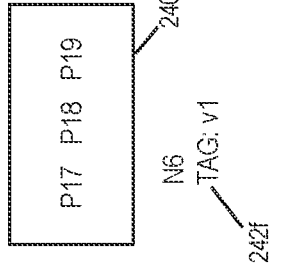
Figure 3B:

Referring now to FIG. 3B, a block diagram is shown of a portion of an exemplary cloud environment 300 illustrating the result of upgrading container nodes, in accordance with exemplary embodiments, as described above in connection with FIG. 3A. The cloud environment includes the server instances 240f, 310a, 310b. The server instances 310a, 310b have been successfully upgraded and now bear version identifiers 320a, 320b of v2, indicating that the relevant server instance configuration (e.g., ASG configuration) has been successfully upgraded to version 2. The cloud environment also includes a map 330b that has been updated to track the server instances 310a, 310b with associated version identifiers v2. The map has also been updated to track associated replacement container nodes, e.g., N9, N10, respectively, that have successfully replaced the previous container nodes N7, N8 (FIG. 3A).

Figure 4:
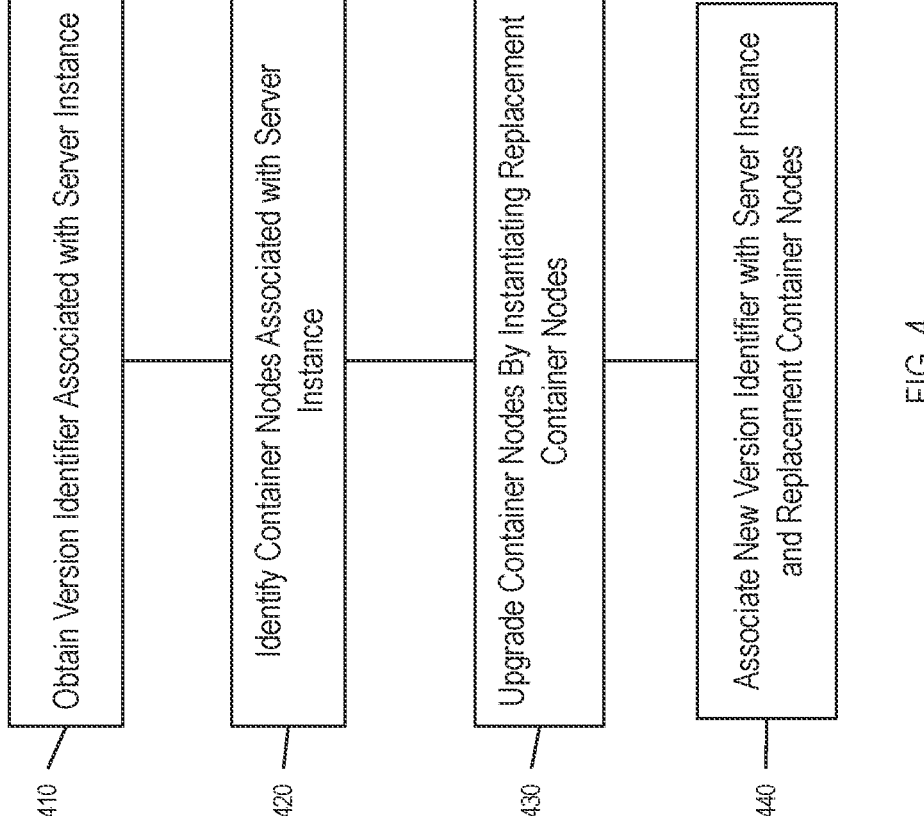
FIG. 4 is a flowchart of an exemplary method for upgrading a container node in a cloud environment, in accordance with exemplary embodiments of the present invention.
Figure 4:

Referring now to FIG. 4, a flowchart is shown of an exemplary method 400 for upgrading a container node in a cloud environment, in accordance with exemplary embodiments.

The present upgrade system obtains a version identifier associated with a cloud-based server instance and one or more container nodes operable in a cloud environment (step 410). In some aspects, the cloud environment includes Amazon Web Services (AWS). In further aspects, the cloud-based server instance is an Amazon Elastic Cloud Computing (EC2) instance. In still further aspects, the cloud-based server instance belongs to an Amazon Auto Scaling Group (ASG). In some aspects, the container nodes are Kubernetes worker nodes. In some aspects, the present upgrade system is configured to obtain the version identifier by querying a map to identify version identifiers that are below a desired version number. The map may track version identifiers, associated server instances, and associated container nodes. The present upgrade system may select among the resulting version identifiers from the query.

The present upgrade system identifies the one or more container nodes that are associated with the cloud-based server instance (step 420). For example, a drain process 230 may subscribe to a container API server 236 (FIG. 2) to identify Kubernetes worker nodes associated with the cloud-based server instance. In some aspects, the container nodes may be operable on multiple cloud environments. Non-limiting example cloud environments include AWS, Google Cloud, Microsoft Azure, or other suitable cloud environments known to one having ordinary skill in the art.

The present upgrade system upgrades the one or more container nodes by instantiating one or more replacement container nodes having a pre-determined upgrade configuration associated with a new version identifier (step 430). In some aspects, the present upgrade system upgrades the one or more container nodes by identifying one or more child objects associated with the one or more container nodes. The present upgrade system may migrate the child objects to one of the replacement container nodes. In further aspects, the child objects may include container deployment units. By way of non-limiting example, the child objects may include Kubernetes pods.

In some aspects, the replacement container nodes may be operable on multiple cloud environments. In further aspects, the replacement container nodes may be operable on a cloud environment that is different from the cloud environment on which the initial container nodes were operable. For example, upgrading the container nodes may further include instantiating the replacement container nodes on a new cloud-based server instance that is operable on a different cloud infrastructure from the initial cloud-based server instance. Advantageously, the present upgrade system is thereby configured to support cloud-independent node upgrade, such that an administrator may upgrade a container node so as to be operable on a new cloud environment that is different from the cloud environment on which the initial container node was originally operable, while incurring minimal to no downtime for users. For example, following a successful upgrade a container node may be operable on Microsoft Azure whereas the initial container node may have initially been configured on Amazon Web Services.

The present upgrade system associates the new version identifier with the cloud-based server instance and the one or more replacement container nodes (step 440). In some aspects, the present upgrade system may associate the new version identifier into the map tracking the version identifiers, the cloud-based server instances, and the container nodes.

Figure 5:
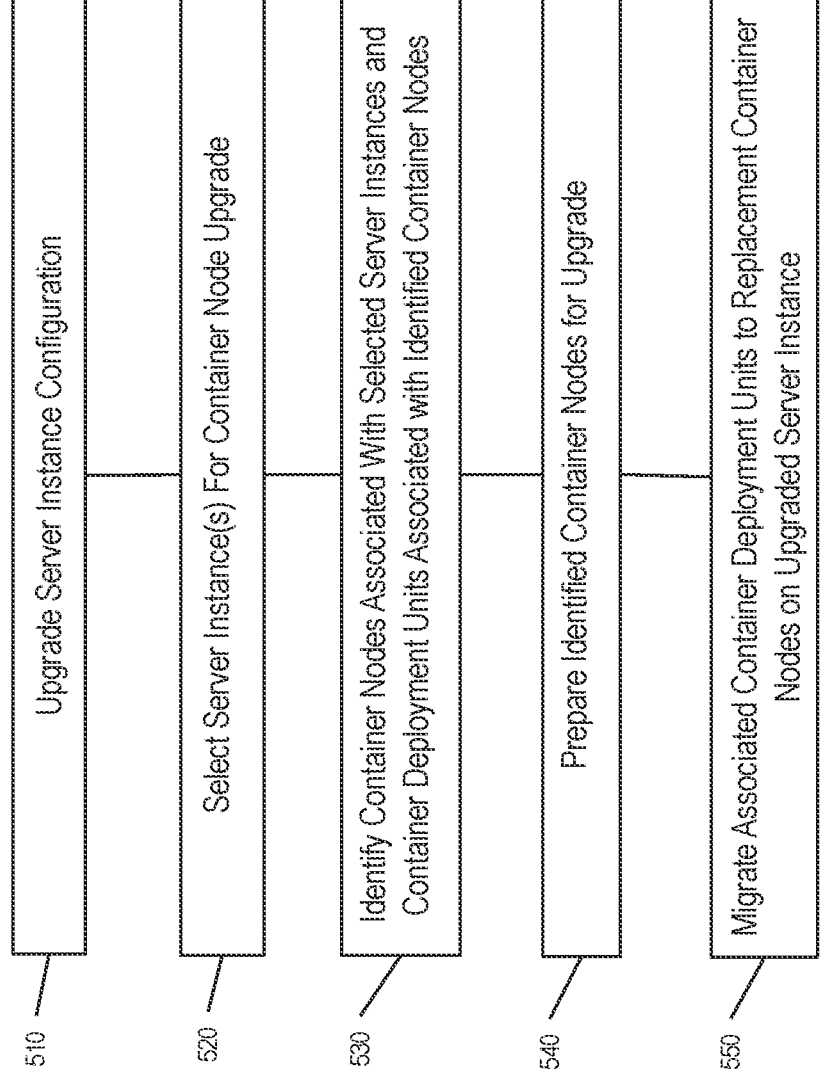
FIG. 5 is a flowchart of an exemplary method for upgrading a container node in a cloud environment, in accordance with exemplary embodiments of the present invention.

Referring now to FIG. 5, a flowchart is shown of an exemplary method 500 for upgrading a container node in a cloud environment, in accordance with exemplary embodiments.

The present upgrade system upgrades a configuration for the cloud-based server instance (step 510). In some aspects, the upgrade service 208 (FIG. 2) triggers a provisioning engine to upgrade the configuration of each server instance 240g, 240h (e.g., each Amazon EC2 instance). For example, the provisioning engine begins with a provisioning subsystem, such as one supplied by Amazon, to update the Amazon ASG configuration for each EC2 instance. By way of non-limiting example, the server instance 240g may have its configuration updated to the desired server instance configuration, e.g., illustrated as a replacement server instance 310a. The server instance 240h may likewise have its configuration updated to the desired server instance configuration, e.g., illustrated as a replacement server instance 310b.

However, although the provisioning subsystem supplied by the public cloud provider (e.g., Amazon) is operable to upgrade the corresponding server instance configuration (e.g., the ASG configuration for each EC2 instance), the present upgrade system avoids executing the Amazon provisioning subsystem to upgrade the configuration running on each EC2 instance itself. This is because the Amazon provisioning subsystem is not designed to support containerized upgrades or allow administrators to specify customized machine images (such as Amazon Machine Images (AMIs)) for upgrade. Accordingly, applying Amazon's provisioning subsystem to upgrade each EC2 instance could result in undesired downtime for the services or containerized applications executing on the EC2 instance. Instead, the present upgrade system provides an automated container upgrade as described in further detail below, in connection with step 540.

The present upgrade system selects a subset or batch of cloud-based server instances for upgrading (step 520). In some aspects, the present upgrade system is configured to select a number of server instances based on a pre-determined percentage of the overall server instances identified as upgradeable (e.g., having a version identifier that is below the desired version identifier). In some aspects, the present upgrade system is configured to select a pre-determined number of server instances for upgrade, such as, for example, 1, 2, 3, 4, 5, 6, 7, 8, 9, or 10 server instances. In some aspects, the present upgrade system is configured to prioritize selected server instances based on how outdated the server instance is, according to the associated version identifier. For example, if the desired version identifier is v3 and the present upgrade system identifies a first server instance having an associated version identifier of v1 and a second server instance having an associated version identifier of v2, the present upgrade system may prioritize selection of the first server instance since its server instance configuration is further out-of-date than the second server instance.

The present upgrade system identifies one or more container nodes configured on each cloud-based server instance of the subset and one or more container deployment units associated with each identified container node (step 530). In some aspects, the present upgrade system queries the container API server 236 (FIG. 2) to identify container nodes for upgrade based on the selected server instances. In further aspects, the present upgrade system queries the container API server to identify container deployment units (e.g., Kubernetes pods) associated with each container node (e.g., Kubernetes worker node) identified by the container API server. In some aspects, the present upgrade system prioritizes container nodes based on their visibility as identified by the container API server. For example, if a Kubernetes worker node is identified as invisible, then the present upgrade system may prioritize upgrading that worker node because the worker node is not visible to the remainder of the Kubernetes cluster.

The present upgrade system prepares the identified container nodes for upgrade (step 540). In some aspects, the present upgrade system queries the container API server 236 (FIG. 2) to identify container deployment units (e.g., Kubernetes pods) associated with the identified container nodes (e.g., Kubernetes worker nodes). In some aspects, the present upgrade system ensures orderly termination of each container deployment unit. Advantageously, the present upgrade system is thereby configured to account for upgrading the container deployment units including the containerized applications running in each container node.

The present upgrade system migrates the one or more container deployment units to one of the replacement container nodes (step 550). Accordingly, upon completion of the upgrade, the container deployment units (e.g., Kubernetes pods) are running in the replacement container nodes (e.g., Kubernetes worker nodes) on server instances (e.g., EC2 instances) that are configured with the desired upgraded configuration (e.g., ASG configuration).

Figure 6:
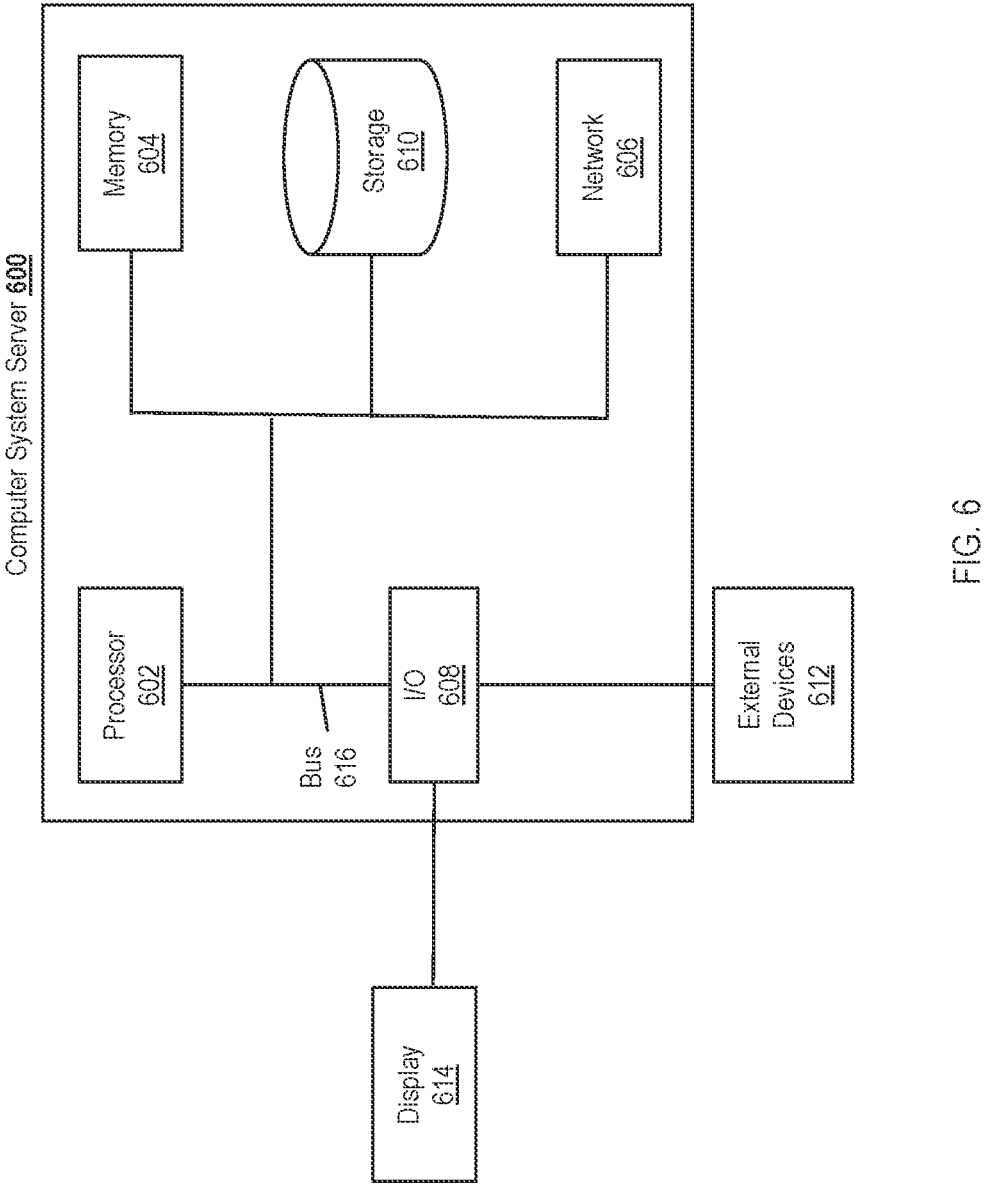
FIG. 6 is a block diagram of an exemplary computer system suitable for upgrading a container node in a cloud environment, in accordance with exemplary embodiments of the present invention.

Referring now to FIG. 6, a block diagram is shown of an exemplary computer system 600 suitable for upgrading a container node in a cloud environment, in accordance with exemplary embodiments. The computer system is shown in the form of a general-purpose computing device. The components of the computer system may include, but are not limited to, one or more processors or processing units 602, a memory 604, a network interface 606, and a bus 616 that communicatively couples various system components including the system memory and the network interface to the processor.

The bus 616 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system 600 typically includes a variety of computer system readable media. Such media may be any available media that is accessible by the computer system, and such media includes both volatile and non-volatile media, removable and non-removable media.

The memory 604 may include computer system readable media in the form of volatile memory, such as random access memory (RAM) and/or cache memory. The computer system may further include other removable/non-removable, volatile/non-volatile computer system storage media. By way of example only, the storage system 610 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 616 by one or more data media interfaces. As has been depicted and described above in connection with FIGS. 1-5, the memory may include at least one computer program product having a set (e.g., at least one) of program modules that are configured to carry out the functions of embodiments of the invention, e.g., cloud-independent upgrade of a container node.

The computer system 600 may also include a program/ utility, having a set (at least one) of program modules, which may be stored in the memory 604 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of embodiments of the invention as described herein.

The computer system may also communicate with one or more external devices 612 such as a keyboard, a pointing device, a display 614, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 608. Still yet, the computer system may communicate with one or more networks such as a local area network (LAN), a general wide area network (WAN), and/or a public network (e.g., the Internet) via the network adapter 606. As depicted, the network adapter communicates with the other components of the computer system via the bus 616. It should be understood that although not shown, other hardware and/or software components could be used in conjunction with the computer system. Non-limiting examples include microcode, device drivers, redundant processing units, external disk drive arrays, Redundant Array of Independent Disk (RAID) systems, tape drives, data archival storage systems, etc.

The various exemplary embodiments of the upgrade systems and methods discussed herein provide numerous advantages over conventional cloud upgrade services. For example, the present upgrade system supports seamless upgrade of containerized applications without the need for conventional downtime. In contrast, conventional cloud provisioning services do not support containerized upgrades or allow administrators to specify customized machine images for upgrade. Accordingly, using conventional cloud upgrade systems to upgrade each server instance could result in undesired downtime for containerized services running on the server instance. The present upgrade system provides an automated container upgrade by ensuring orderly termination of each container deployment unit, and accounts for upgrading the container deployment units including the containerized applications running in each container node.

Another advantage of the present upgrade system is allowing for a node upgrade that is decoupled from the underlying cloud environment or cloud infrastructure. Accordingly, the present upgrade system allows an administrator to upgrade a container node so as to be operable on a new cloud environment that is different from the cloud environment on which the initial container node was originally operable, while incurring minimal to no downtime for users.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the subject disclosure may have been presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the present disclosure may be practiced without one or more of the specific features or advantages of a particular exemplary embodiment. In other instances, additional features and advantages may be recognized in certain embodiments that may not be present in all exemplary embodiments of the subject disclosure.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

What is claimed is:

1. A computer system for upgrading one or more container nodes in a cloud environment, the system comprising:

a processor coupled to a memory and a network interface, wherein the processor is configured to:

obtain a version identifier associated with a cloud-based server instance having an outdated server instance configuration;

identify for an upgrade one or more container nodes associated with the cloud-based server instance, wherein the one or more container nodes identified for the upgrade belong to a cluster and the upgrade of the one or more container nodes identified for the upgrade is prioritized based on the one or more container nodes identified for the upgrade being non-visible with respect to other container nodes within the cluster;

upgrade the one or more container nodes identified for the upgrade by instantiating one or more replacement container nodes having a pre-determined upgrade configuration associated with a new version identifier;

associate the new version identifier with the cloud-based server instance and the one or more replacement container nodes; and mark for termination the one or more container nodes identified for the upgrade.

2. The system of claim 1, wherein the processor is configured to associate the new version identifier into a map tracking a plurality of version identifiers, a plurality of cloud-based server instances, and a plurality of non-visible container nodes.

3. The system of claim 1, wherein the processor configured to upgrade the one or more container nodes comprises the processor being further configured to:

upgrade a configuration for the cloud-based server instance;

select a subset of cloud-based server instances for upgrading;

identify the one or more non-visible container nodes configured on each cloud-based server instance of the subset and one or more container deployment units associated with each identified non-visible container node;

prepare the identified one or more non-visible container nodes for upgrade; and migrate the one or more container deployment units to one of the replacement container nodes.

4. The system of claim 3, wherein the processor configured to upgrade the configuration for the cloud-based server instance comprises the processor being further configured to provision an updated configuration for the cloud-based server instance.

5. The system of claim 4, wherein the processor is configured to select the subset of cloud-based server instances based on a visibility of the identified one or more non-visible container nodes configured on each cloud-based server instance.

6. The system of claim 1, wherein the system is operable outside a container cluster of the one or more container nodes.

7. The system of claim 1, wherein the system is operable in a control plane of a container cluster of the one or more container nodes.

8. A method for upgrading one or more container nodes in a cloud environment, the method comprising:

obtaining a version identifier associated with a cloud-based server instance having an outdated server instance configuration;

identifying for upgrade the one or more container nodes associated with the cloud-based server instance, wherein the one or more container nodes identified for the upgrade belong to a cluster and the upgrade of the one or more container nodes identified for the upgrade is prioritized based on the one or more container nodes identified for the upgrade being non-visible with respect to other container nodes within the cluster;

upgrading the one or more container nodes by instantiating one or more replacement container nodes having a pre-determined upgrade configuration associated with a new version identifier, wherein the upgrading the one or more container nodes further comprises upgrading a configuration for the cloud-based server instance;

selecting a subset of cloud-based server instances for upgrading based on a visibility of the one or more container nodes configured on each cloud-based server instance; and associating the new version identifier with the cloud-based server instance and the one or more replacement container nodes, and marking for termination the one or more container nodes.

9. The method of claim 8, wherein the upgrading the one or more container nodes further comprises identifying one or more child objects associated with the one or more container nodes.

10. The method of claim 9, wherein the upgrading the one or more container nodes further comprises migrating the one or more child objects to the one or more replacement container nodes.

11. The method of claim 9, wherein the one or more child objects comprise one or more container deployment units.

12. The method of claim 9, wherein the one or more child objects comprise one or more Kubernetes pods.

13. The method of claim 8, wherein the one or more container nodes are operable on a plurality of cloud environments.

14. The method of claim 8, wherein the one or more replacement container nodes are operable on a plurality of cloud environments.

15. The method of claim 8, wherein the one or more replacement container nodes are operable on a cloud environment that is different from the cloud environment on which the one or more container nodes are operable.

16. The method of claim 8, wherein the upgrading the one or more container nodes further comprises instantiating the one or more replacement container nodes on a new cloud-based server instance that is operable on a different cloud infrastructure from the initial cloud-based server instance.

17. The method of claim 8, wherein the cloud-based server instance comprises an Elastic Cloud Computing instance.

18. The method of claim 8, wherein the cloud-based server instance belongs to an Auto Scaling Group.

19. The method of claim 8, wherein the one or more container nodes comprise one or more Kubernetes worker nodes.

* * * * *